Sept. 19, 1944.   W. W. GARSTANG   2,358,452
WAFFLE IRON
Filed Aug. 17, 1942
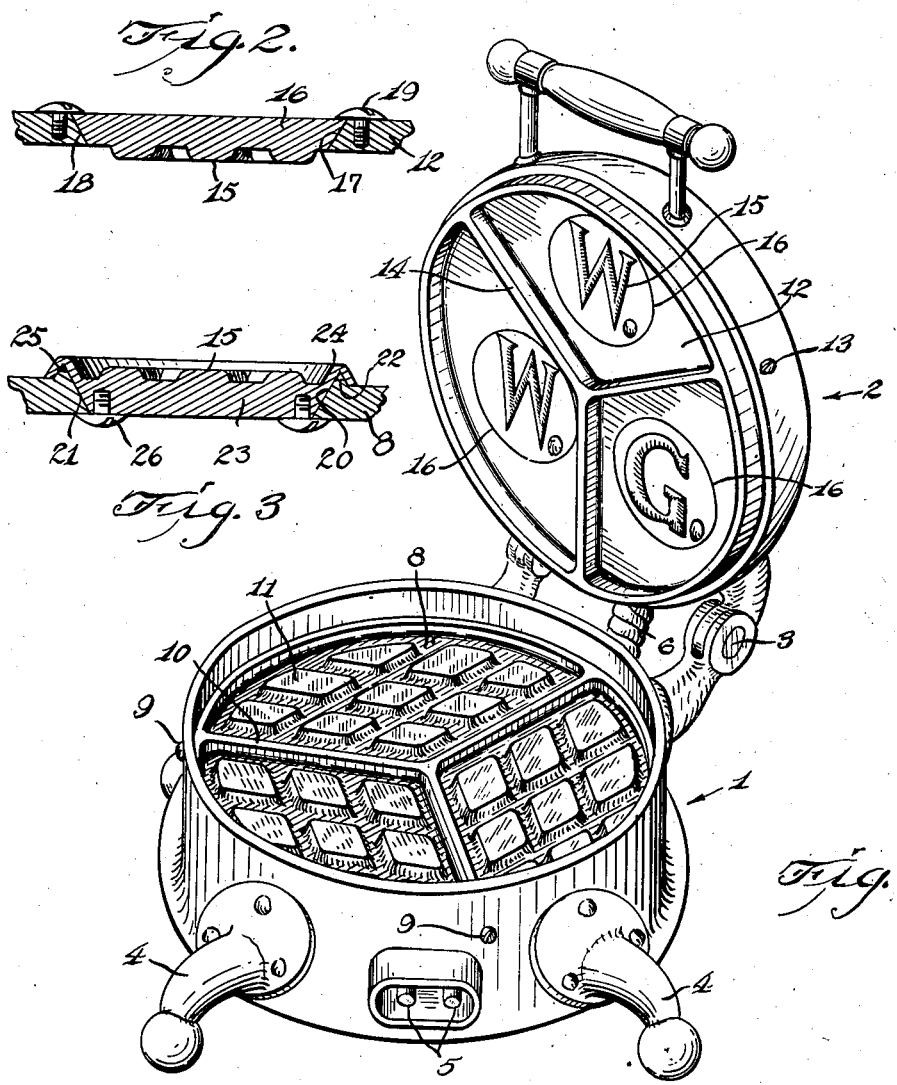
INVENTOR.
William W. Garstang
BY:
ATTORNEY Patented Sept. 19, 1944

2,358,452

UNITED STATES PATENT OFFICE 2,358,452

WAFFLE IRON

William W. Garstang, Indianapolis, Ind.

Application August 17, 1942, Serial No. 455,031

2 Claims. (Cl. 99—372)

The present invention relates to improvements in electrical cooking grills and more particularly to an improvement in electrically heated or operated waffle irons.

The invention has for one of its objects the provision of a waffle iron within which a suitable monogram or suitable initial letters may be formed in the waffle during the cooking thereof.

Another object of the invention is to provide a waffle iron having the above characteristics wherein the heating or grill unit may be readily changed to permit the forming in the surface of the waffle being cooked different monograms or different letters or the like.

For the purpose of disclosing my invention I have illustrated an embodiment thereof in the accompanying drawing in which Fig. 1 is a perspective view of a waffle iron illustrating one embodiment of my invention;

Fig. 2 is a detail section showing means for securing removable inserts in the grill of the iron;

Fig. 3 is a detail section of a modification of the means for removably securing inserts in the grill; and Fig. 4 is a detail section of a still further modification.

In the embodiment of the invention illustrated, I have shown the usual commercial type of waffle iron having a bottom section 1 and a top section 2 hingedly connected as at 3, as is usual in said structures and providing the suitable supporting legs 4. The bottom section is provided with connection terminals 5 which lead to the resistance or heating elements mounted within the bottom section 1 and a suitable conduit or conductor 6 leads from the heating element in the bottom section to the heating element mounted in the top section. So far as described, the structure is similar to the usual commercial type of waffle iron now on the market. These electrically heated waffle irons are provided with suitable heating elements mounted in their bottoms and tops and these heating elements are covered by suitable grills. In the structure illustrated, the grill 8 is preferably formed of aluminum or other desirable heat-conducting material and this grill is supported within the bottom 1, above the heating element, being secured in position therein by removable screws 9. The top surface of this grill is provided with preferably three radial ribs 10 and between these three radial ribs 10 there is provided the usual grill ribs 11 for breaking the waffle up.

The top section 2 is likewise provided with the usual heating element and with a grill 12 which is removably secured in position by removable screws 13. This grill is preferably formed of aluminum or other heat conducting material and on its bottom face has formed thereon three radial ribs 14, coincident with the radial ribs 10 on the bottom section. Also formed in the face of the grill 12 are raised ribs 15 which take the forms of suitable letters of the alphabet, or suitable monogram letters.

These monograms or letters are preferably formed on insertible plugs 16 which are secured in position in the grill proper. To this end, as shown in Fig. 2, and for the upper section, the grill 12 is provided with openings 17, the walls of which taper inwardly toward the face of the grill as at 18. The discs 16 have correspondingly tapered walls and after the discs have been placed in position they may be secured in position by suitable screws 19 threaded into the grill proper and having their heads bearing upon the rear foot surface of the insertible discs. By this arrangement, where the structure is used in the upper grill, the removable discs 16 may be provided with different letters or characters as assembled to suit the whim or desire of each individual purchaser.

Where it is desirable that the monogram or letters be used on the bottom grill, the bottom grill is provided with a more or less plain surface or with a surface similar to that of the top grill and is provided with openings 20 having the walls thereof tapering as at 21 towards the back of the grill. The face of the grill, at the points surrounding these openings, is provided with a raised rib 22. The insert 23 has its walls tapered to conform to the taper 21 of the walls of the opening 20 and is likewise provided with an annular rib 24 having a groove 25 on its under face conforming to the shape of and receiving the groove 22. Suitable screws 26 fitting in the insert with their heads overlapping the grill proper prevent the displacement of the insert in one direction while the shape of the walls of the opening and the insert prevent movement in the opposite direction. This arrangement is preferably adaptable for the bottom grill as it provides a means for preventing the escape of any grease or the waffle material through the grill and into the heating element below.

In the structure illustrated in Fig. 4, I have shown a modification of the structure shown in Fig. 3 wherein, instead of retaining screws, as 26, I provide a split ring 27 fitting within half grooves on the meeting faces of the ribs 22 and 24 to retain the disc in position.

It is obvious that with the above structure, I am enabled to form in the face of the waffle when cooked any suitable monogram or initial desirable and I provide means whereby either the distributor or manufacturer may make various combinations for the stock without the necessity of especially casting each grill separately.

I claim as my invention:

1. A waffle cooking apparatus comprising upper and lower shells adapted to contain suitable heating elements and hingedly connected together, a cooking grill arranged in each of said shells in front of said elements and adapted to provide cooking surfaces, the cooking surface of the lower of said grills being provided with symmetrically arranged projections and the upper of said grills being provided with an opening therein, a continuous rib surrounding said opening and a removably insertible plug fitting within said opening having a rib on the surface thereof in the form of a letter of the alphabet and having an annular hollow flange overlapping the rib on the grill.

2. A waffle cooking apparatus comprising upper and lower shells adapted to contain suitable heating elements and hingedly connected together, a cooking grill arranged in each of said elements and adapted to provide cooking surfaces, the cooking surface of one of said grills being provided with symmetrically arranged projections and the other of said grills being provided with an opening therein, a continuous rib surrounding said opening and a removable insertible plug fitting within said opening and provided on its surface with a decorative pattern, said plug having an annular hollow flange overlapping the rib on the grill.

WILLIAM W. GARSTANG.